United States Patent
Ushikoshi

[11] Patent Number: 5,939,849
[45] Date of Patent: Aug. 17, 1999

[54] MOTOR SPEED CONTROLLER

[75] Inventor: Isao Ushikoshi, Nagano, Japan

[73] Assignee: Sankyo Seiki Mfg. Co., Ltd., Nagano-ken, Japan

[21] Appl. No.: 09/023,322

[22] Filed: Feb. 13, 1998

[30] Foreign Application Priority Data

Feb. 17, 1997 [JP] Japan ..................... 9-031908

[51] Int. Cl.[6] ................ H02P 5/28; G11B 5/09
[52] U.S. Cl. ............. 318/254; 318/798; 318/560; 318/561; 369/50; 369/59
[58] Field of Search ................ 318/138, 139, 318/245, 254, 439, 600–610, 560, 799, 561, 798, 807; 369/50, 59, 54, 48

[56] References Cited

U.S. PATENT DOCUMENTS

| | | | |
|---|---|---|---|
| 4,445,087 | 4/1984 | Mehnert | 324/175 |
| 4,449,191 | 5/1984 | Mehnert | 364/559 |
| 5,175,479 | 12/1992 | Tajima et al. | 318/560 |
| 5,473,239 | 12/1995 | Kobayashi et al. | 318/798 |
| 5,796,691 | 8/1998 | Furukawa et al. | 369/50 |

FOREIGN PATENT DOCUMENTS 6-165565  6/1994  Japan .

*Primary Examiner*—Paul Ip
*Attorney, Agent, or Firm*—McAulay Nissen Goldberg Kiel & Hand, LLP

[57] ABSTRACT

In a motor speed controller (which, in accordance with rotations of a rotor having a drive magnet, detects an induced voltage in each of drive coils in m phases less than the number of drive magnets wound around a stator, generates speed signals which includes m square wave pulses at every 360° in electrical angle, based on the induced voltage, and controls motor driving voltage applied to each of the drive magnets according to the speed signals), the present invention employs a configuration comprised of: period detecting circuit for detecting periods between rising edges or falling edges of a pulse that occurs every (P-1) pulse of the pulses included in the speed signals; speed deviation signal generating circuit for generating speed deviation signals, comparing detected periods to a predetermined reference period; and drive control circuit for correcting the motor drive voltage, which is applied to said drive coils, based on the speed deviation signals so that the rotating speed of the rotor meets a targeted rotating speed.

5 Claims, 5 Drawing Sheets

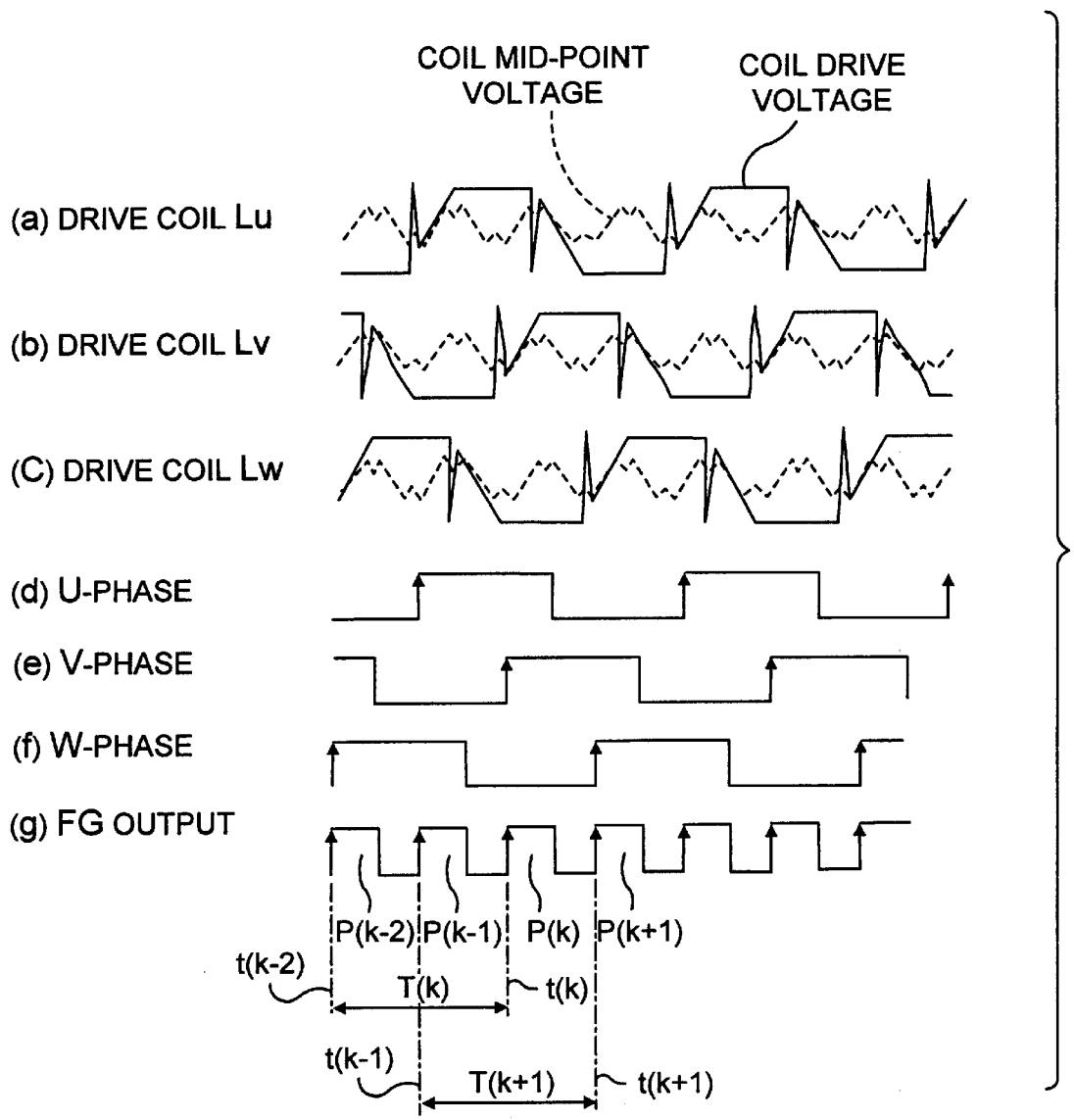
F I G. 3

MOTOR SPEED CONTROLLER

BACKGROUND OF THE INVENTION a) Field of the Invention

The present invention relates to a motor speed controller employed in brushless motors and the like which generates speed signals based on induced voltages in drive coils wound around a stator and controls a motor rotational speed at a targeted value based on the speed signals.

b) Description of the Related Art

In brushless motors, a rotational angle position of a rotor is detected by using a magnetic pole sensor such as a Hall element, and an electrification of a drive coil wound around a stator is controlled based on the detection result to produce a rotating magnetic field. A speed controller employed in such a motor generally detects an induced voltage in the drive coil in each phase induced when the rotor rotates and then synthesizes the detected induced voltages to generate speed signals comprised of square wave pulse trains. Next, the signals obtained by converting the pulse frequency of the speed signal to voltages are compared to a predetermined reference voltage to obtain speed deviations. Then, to cancel the speed deviations, the motor driving voltage is corrected so that it is applied on the drive coil in each phase.

In the above manner, the motor speed controller performs feedback control of the rotating speed of the motor, using the speed signals generated based on the induced voltage in the drive coil in each phase. Therefore, the generated speed signals should reflect an actual rotating speed of the motor in an accurate manner in order to precisely control the speed.

When the polarized pitch of the drive magnets on the rotor contains errors, however, the generated speed signals may not be accurately reflecting the actual rotating speed of the motor. In other words, the ring-like drive magnet on the rotor is polarized at a constant pitch in a circumferential direction by using a polarizing device. At this time, if the center of the drive magnet is shifted from the center of the polarizing head of the polarizing device, the drive magnet will have a portion having a different polarized pitch.

When employing an annular drive magnet made by joining both edges of a belt-like magnetic material, a slight difference in polarized pitch may occur in the joint portion.

In a brushless motor having such a drive magnet which contains portions different in polarized pitch, if speed signals (FG signals) are generated by synthesizing the induced voltage in each phase, the fluctuations of the polarized pitch will appear as changes in pulse periods of the speed signals.

In the case of a three-phase brushless motor as illustrated in FIG. 4(A), for example, twelve (12) poles are formed by the three-phase drive coils U, V, W on a stator 3 with a ring-like drive magnet 7 on a rotor 4 surrounding the stator 3 which is polarized with 16 poles. With this configuration, let us suppose that the polarized pitch on a pair of magnetic poles indicated by diagonal lines is slightly different from other portions. In other words, let us suppose that a fluctuated portion of the polarized pitch appears once every complete turn of the rotor 4.

In this case, U-phase signal, V-phase signal, and W-phase signal obtained from the induced voltage in the drive coil in each U, V, W phase are as shown in FIG. 4(C). As shown in the figure, when the U-phase drive coil first passes the fluctuated portion of the polarized pitch (diagonal lines of FIG. 4 (A)), the fluctuation in pitch appears in the induced voltage. In FIG. 4(C), the rising edges shown by broken lines indicate no fluctuations in polarized pitch while the rising edges shown by solid arrows indicate the fluctuations in polarized pitch. In the same manner, the fluctuations in polarized pitch occur in the induced voltage generated in a drive coil in each phase.

Consequently, the pulse period of the speed signal FG obtained by synthesizing these signals includes errors caused by the fluctuation in polarized pitch. That is, even when the actual rotation of the motor is constant, the pulse period of the speed signal does not become constant but fluctuates. The feedback control of the motor speed based on the speed signals is performed in a direction in which the pulse period of the speed signal becomes constant; therefore, the appropriate control cannot be accomplished.

To solve such a problem, a method, for example, disclosed in Tokkai H6-165565, the application of the present applicant can be employed. In the speed controlling method in this patent, from the viewpoint that the above mentioned error occurs periodically every m pulse in an m-phase motor, frequency-divided-signals are generated in which the pulse containing errors is removed by dividing the speed signal in at least m frequencies, and the feedback control of the speed is performed based on the frequency-divided signals.

With the above mentioned method, the speed control can be performed based on the signals precisely reflecting the actual rotational condition of the motor. However, if the speed signal is divided in frequencies, the control gain will be accordingly decreased. For this reason, the speed control may be unstable in some cases when such a method is employed.

OBJECT AND SUMMARY OF THE INVENTION

A primary object of the present invention is, considering these problems, to provide a motor speed controller in which, without frequency-dividing the speed signals, the fluctuations in pulse period of the speed signals caused by the polarized pitch errors in the drive magnet are removed to precisely perform the speed control.

To solve the above problems, in a motor speed controller (which, in accordance with rotations of a rotor having a drive magnet, detects an induced voltage in each of drive coils in m phases less than the number of drive magnets wound around a stator, generates speed signals which includes m square wave pulses at every 360° in electrical angle, based on the induced voltage, and controls motor driving voltage applied to each of the drive magnets according to the speed signals), the present invention employs a configuration comprised of:

period detecting circuit for detecting periods between rising edges or falling edges of a pulse that occurs every (P-1) pulse of the pulses included in the speed signals;

speed deviation signal generating circuit for generating speed deviation signals, comparing detected periods to a predetermined reference period; and drive control circuit for correcting the motor drive voltage, which is applied to said drive coils, based on the speed deviation signals so that the rotating speed of the rotor meets a targeted rotating speed.

The above mentioned P is an integer satisfying the formula, $\theta_p = P \times \theta m$, where $\theta_p$ is a mechanical angle alternately made by an arbitrary one phase of m-phase drive coils and $\theta m$ is a mechanical angle corresponding to 360° in electrical angle, based on the induced voltage.

Generally included in the speed signal obtained in an m-phase motor are m pulses based on the induced voltage in the drive coil in each phase at every 360° in electrical angle.

These pulses are generated periodically. Accordingly the pulse, in which the rising edge position is deviated because of errors in polarized pitch, occurs every (P−1) pulse. For instance, such a pulse occurs every other pulse in the three-phase motor.

Since the fluctuation amounts of the rising edge positions are equal, the period between the rising edges of the pulse generated every (P−1) pulse is the same as the one between the rising edges of the pulse generated every (P−2) pulse which does not contain errors. In other words, the period between the rising edges of the pulse generated every (P−1) pulse is always constant as long as the motor rotates at a constant speed.

Paying attention to this point, the present invention detects with the above configuration a period between the rising edges or falling edges of the pulse generated in every (P−1) pulse and performs feedback control of the motor speed based on the period. Therefore, according to the motor speed controller of the present invention, a precise speed control can be performed without being affected by the fluctuations in pulse periods of the speed signals which are caused by the fluctuations in the polarized pitch in the drive magnet.

BRIEF DESCRIPTION OF THE DRAWINGS

In the drawings:

FIG. 3 diagrammatically shows signal wave forms at each portion of the motor speed controller of FIG. 2; FIG. 4(A) is a descriptive drawing showing fluctuations in polarized pitch of the drive magnet; FIG. 4(B) is a descriptive drawing showing the condition after being rotated by 360° in electrical angle from the condition of (A); FIG. 4(C) diagrammatically shows signal wave forms in each portion of the speed controller obtained in the presence of the fluctuation in polarized pitch.

DESCRIPTION OF THE PREFERRED EMBODIMENTS

Figure 1A:
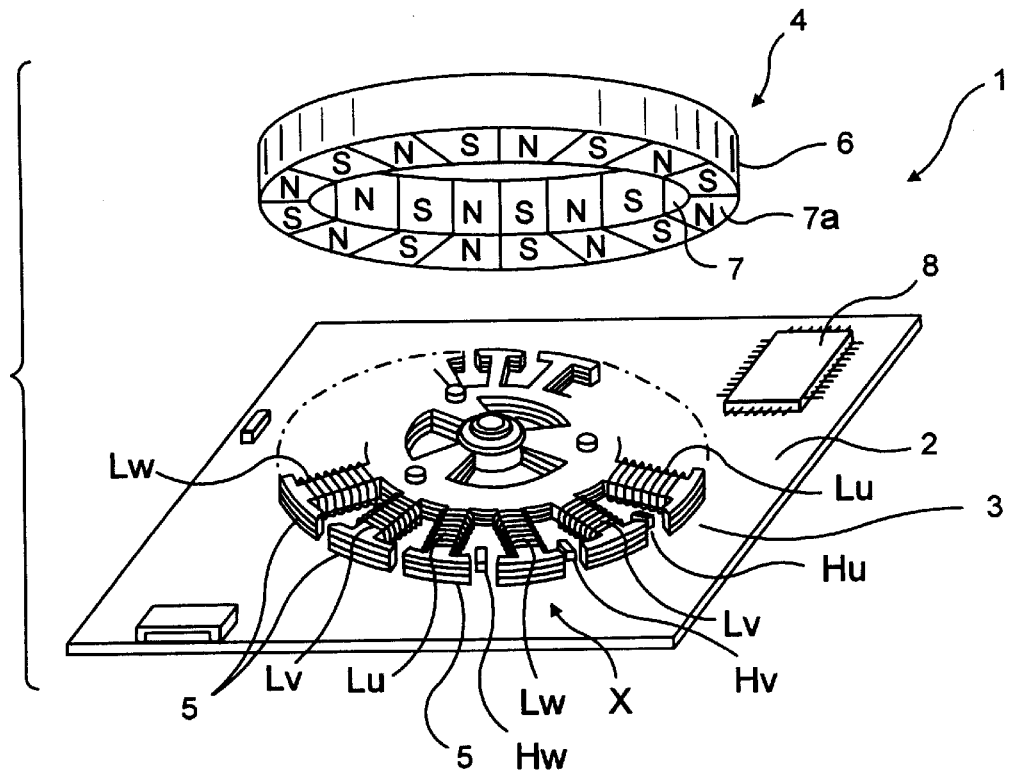
FIG. 1(A) is a dissembled perspective view of a major portion of a three- phase brushless motor to which the present invention can be applied.

An embodiment of a speed controller of a three-phase motor to which the present invention is applied will be described in detail referring to the drawings.

Figure 1B:
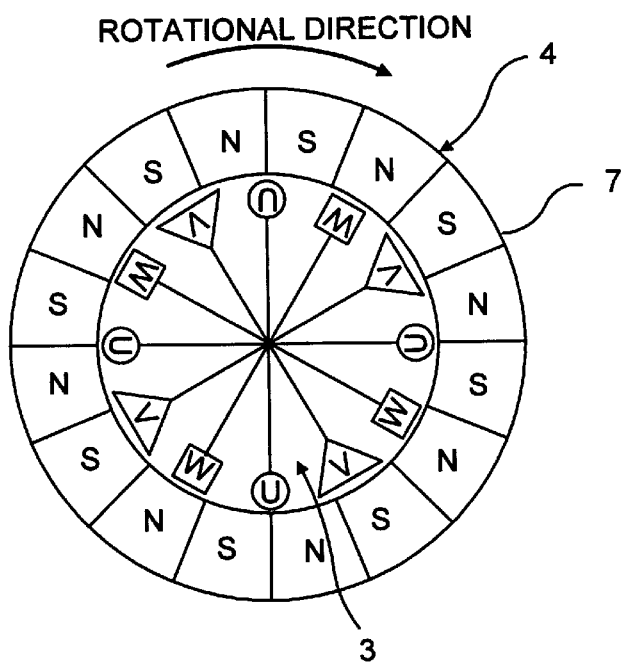
FIG. 1(B) is a diagram showing the relationship between an arrangement of a drive coil in each phase of the brushless motor and an arrangement of magnetic poles of a drive magnet.

FIG. 1(A) illustrates a dissembled major portion of a mechanical configuration of a three-phase brushless motor to which the present invention can be applied. A brushless motor 1 illustrated in this figure is of an outer rotor type, in which a ring-like rotor 4 is rotatably mounted such that it surrounds an outer circumference of a stator 3 mounted on a circuit board 2. Formed on the stator 3 are twelve salient-poles 5 paced at constant angular intervals. Around each salient-pole 5, drive coils Lu, Lv, Lw in U, V, W phases are wound in this sequence. On the rotor 4, a ring-like drive magnet 7 is attached on the inner side of a cup-like case 6, and sixteen magnetic poles are formed on the drive magnet 7. The drive magnet 7 is adhered to the inner side of the cup-like case 6 such that it is formed in annular by joining both edges of a belt-like magnetic material to facilitate installation. Therefore, FIG. 1(B) shows the positional relationship between the drive coil in each phase in the stator and the magnetic poles on the rotor.

An annular edge surface 7a of the drive magnet 7 on the circuit board side is also polarized with sixteen poles. On the surface of the circuit board 2 to which the annular edge surface 7a faces, Hall elements Hu, Hv, Hw are attached as signal sensors. Based on the outputs from the Hall elements, the motor driving voltage to be applied to the drive coil in each phase is generated. Mounted on the circuit board 2 is an IC chip 8 for the motor control. Built in the IC chip 8 is a circuit which contains a motor speed controller comprised of, for example, micro computers.

Figure 2:
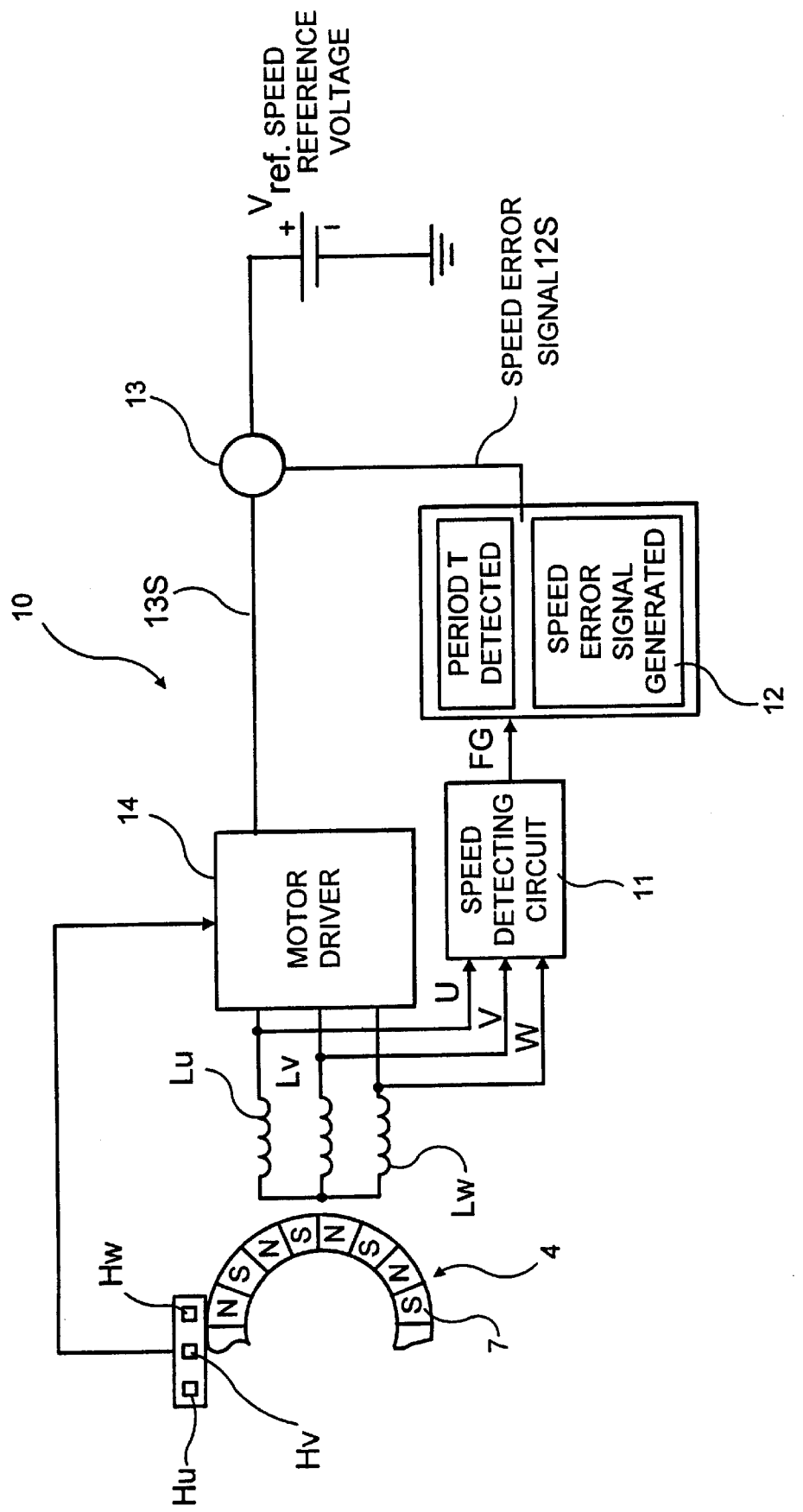
FIG. 2 is a block diagram of a motor speed controller according to the present invention.

FIG. 2 shows a configuration of a major portion of a speed controller 10 of the brushless motor 1 of this embodiment. The speed controller 10 of this embodiment detects an induced voltage in the drive coil Lu, Lv, Lw in each phase conducted when the rotor 4 rotates, and generates a speed signal FG by synthesizing, in a speed detecting circuit 11, the detected induced voltage in each phase.

FIG. 3 diagrammatically shows shaped wave forms of the induced voltage obtained by comparing and synthesizing the coil driving voltage with coil mid-point voltage in each of u, v, w phases and a speed signal FG wave form obtained by the speed detecting circuit 11. In this figure, (a), (b), and (c) respectively show a driving voltage wave form of each drive coil, and broken lines indicate coil mid-point voltages. Also (d), (e), and (f) indicate the output in each phase obtained from the induced voltage; (g) is an FG output obtained by synthesizing the output in each phase. As shown in the figure, the speed signal FG is comprised of pulse trains having the rising edge synchronized with the rising edge of the induced voltage obtained from the drive coil in each phase. When the motor 1 is controlled at a constant speed, the pulse period becomes constant.

Referring to FIG. 2 again, the speed controller 10 has a control circuit 12, and the speed signal FG generated in the above manner is supplied thereto. In the control circuit 12, the period between the rising edges which occurs every other pulse, out of the pulse train included in the supplied speed signal FG, is obtained. Describing in other words referring to FIG. 3, when the pulse P(k) is supplied, obtained is a period T(k) from the rising edge t(k) of the pulse to the rising edge t(k−2) of the pulse P(k−2) which is the second prior pulse. In the same manner, when the next pulse P(k−2) is input, obtained is a period T (k+1) from the rising edge t(k) of the input pulse to the rising edge t(k−1) of the pulse P(k−1) which is the second prior pulse. Then, the period T(n) between the pulse rising edges every other pulse is obtained in sequence in the same manner.

In the control circuit 12, the obtained period T(n) between the pulse rising edges is compared to a reference clock signal of a predetermined frequency (for example, reference clock signal of 720 Hz) or to a frequency-divided signal of the reference block signal. When the motor 1 is kept in a constant rotation, the period T(n) is constant; therefore, the error when referred to of the period of the reference clock signal is zero. When the motor speed deviates, the period T(n) also fluctuates; therefore, a shift occurs from the period of the reference clock signal. The control circuit 12 outputs a speed error signal 12S obtained by converting the compared result to the voltage fluctuations corresponding to the error.

The speed error signal 12S is supplied to an adder 13 of the speed controller 10. In the adder 13, a speed reference voltage, Vref, is supplied for maintaining the motor constant.

Accordingly, in the adder 13, the speed error signal 12S is added to the speed reference voltage, Vref, and a speed deviation signal 13S is produced corresponding to the fluctuation of the motor speed.

The speed deviation signal 13S is supplied to a motor driver 14 of the speed controller 10. The motor driver 14 is of the same kind as a publicly known brushless motor. The motor driver 14 produces drive signals to be supplied to the drive coil of each phase based on the information on a rotor position detection obtained in the Hall elements, and also corrects the drive signal according to the speed deviation signal 13S supplied from the adder 13, and then supplies the corrected drive signal to the drive coil of the corresponding phase.

Figure 4A:
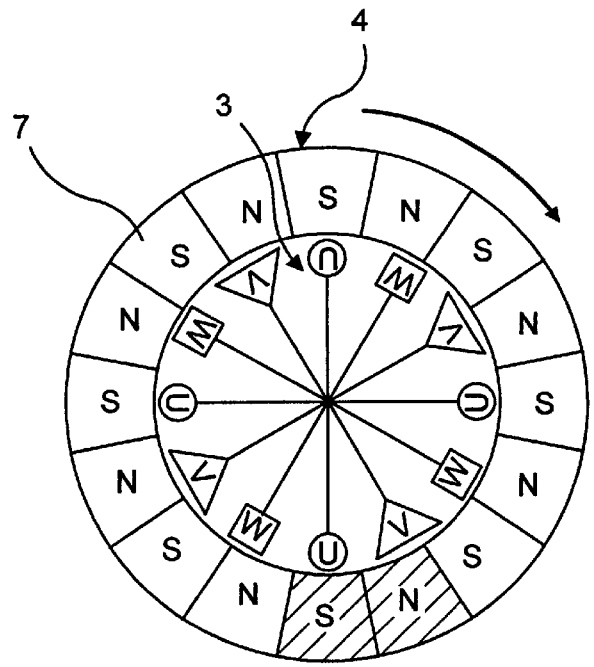
FIGS. 4(A), 4(B), and 4(C) Figures showing a movement in the speed controller of FIG. 2.

As shown in FIG. 4(A), suppose that the polarized pitch of the ring-like drive magnet 7 is different in the portion indicated by diagonal lines from other portions. Under the condition of the figure, a pitch fluctuation appears in the emf induced in the U-phase drive coil Lu. As a result, as shown in FIG. 4(C), a leading effect caused by the fluctuations in polarized pitch occurs in the rising edge t(k−1) of the pulse P(k−1) of the speed signal FG.

Figure 4B:
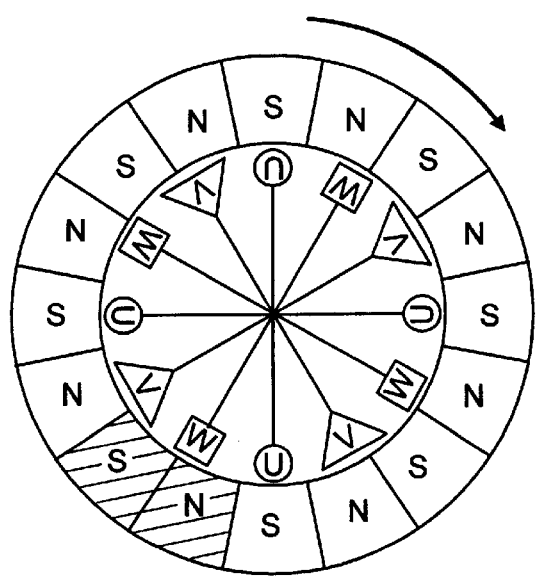
Figure 4C:
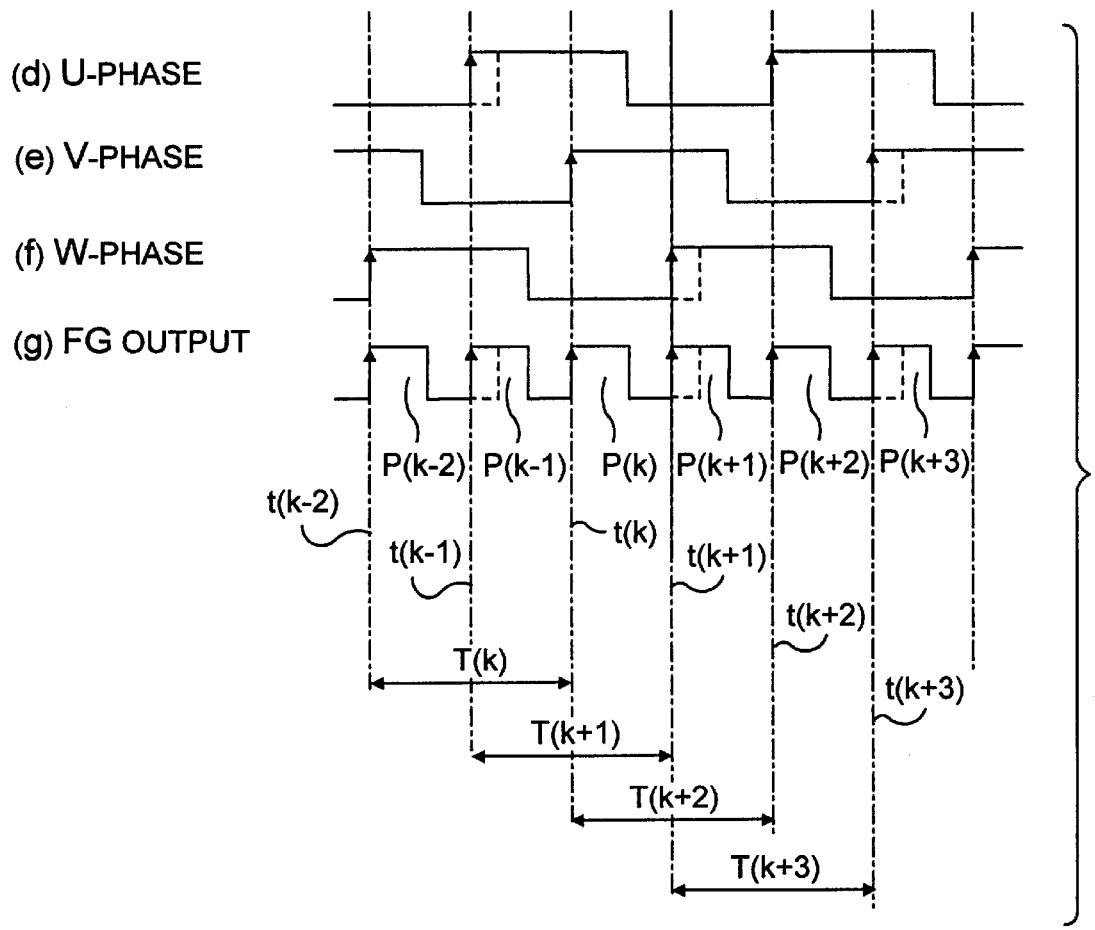

When the rotor 4 rotates and is in the status shown in FIG. 4(B), that is, in the condition where the rotor 4 rotates by 360° in electrical angle, the fluctuating portion of polarized pitch (the portion by diagonal lines) shifts between the poles of the U-phase drive coil Lu. For this reason, the fluctuation in polarized pitch does not appear in emf induced in the U-phase drive coil Lu.

Meanwhile, in the V-phase drive coil Lv, the fluctuating portion in polarized pitch passes 480° lagged in electrical angle. Therefore, the impact by the fluctuation in polarized pitch appears at a position 480° lagged in electrical angle in the emf induced in the drive coil Lv. In other words, in FIG. 4(C), a leading caused by the fluctuation in polarized pitch appears in the rising edge t(k+3) of the pulse P(k+3) of the speed signal FG. It is same for the emf induced in the W-phase drive coil Lw.

Consequently, a leading caused by the fluctuation in polarized pitch, such as the pulse P(k−1), P(k+1), P(k+3) . . . appears in every other rising edge such as t(k−1), t(k+1), t(k+3) . . .

However, in the speed controller 10 of the present invention, every other period T(k) of the pulse rising edge is computed, and the speed control is performed based on the computed period. As shown in FIG. 4(C), when the motor is kept in a constant rotation, every other period T(k), T(k+1), T(k+2) T(k+3) . . . becomes constant and they are not affected by the fluctuation in polarized pitch of the drive magnet 7. Therefore, according to the speed controller 10 of the present invention, a precise speed control of a motor can always be performed regardless of the fluctuation in polarized pitch of the drive magnet 7.

Note that the present invention can be applied even when the rising edges of the speed signal FG are lagged due to the fluctuation in polarized pitch of the drive magnet. The present invention can be applied as it is even when the fluctuation in polarized pitch of the drive magnet is caused at a plurality of places in the circumferential direction. If a device for precisely detecting the period between the falling edges of the speed signal FG is provided, needless to say, the same effects as above will be obtained for the speed control by using the falling edge of the speed signal FG.

Described below is an application of the present invention to a three-phase motor. However, the present invention also can be applied to motors other than the three-phase ones. Basically if, in an m-phase motor, the number of magnetic poles of a drive magnet is set to be more than m, the period between the rising edges of the pulse which appears in every (P−1) pulse in the pulse train contained in the speed signal, becomes constant without being affected by the fluctuation in polarized pitch of the drive magnet as long as the motor speed is maintained constant. Therefore, the speed control of the motor may be performed based on the period.

As described above, according to the motor speed controller of the present invention, errors in the speed signals caused by the fluctuation in polarized pitch of the drive magnet can be eliminated without frequency-dividing the speed signals generated based on the emf induced in the drive coil in each phase. Therefore, a precise motor speed control can be performed without decreasing control gain.

What is claimed is:

1. A motor speed controller which, in accordance with rotations of a rotor having drive magnets, detects an induced voltage in each of drive coils in m-phases less than the number of drive magnets wound around a stator, produces speed signals including m square wave pulses at every 360° of electrical angle, based on said induced voltage, and controls motor driving voltage applied to each of said drive magnets according to said speed signals, said motor speed controller comprising:

period detecting means for detecting periods between rising edges or falling edges of a pulse that occurs every P−1 pulse of the pulses included in said speed signals;

speed error signal generating means for generating speed error signals, by comparing detected periods to a predetermined reference period; and drive control means for correcting said motor drive voltage which is applied to said drive coils based on said speed error signals so that a rotating speed of said rotor meets with a targeted rotational speed;

wherein said P is an integer satisfying a formula, $\theta_p = P \times \theta m$, where $\theta_p$ is a mechanical angle alternately made by an arbitrary one phase of m-phase drive coils and $\theta m$ is a mechanical angle corresponding to 360° in said electrical angle, based on said induced voltage.

2. The motor speed controller as set forth in claim 1 wherein said period sensor detects the period between pulse rising edges or the period between pulse falling edges which occurs every other pulses.

3. The motor speed controller as set forth in claim 1 wherein a ratio between the numbers of said drive magnets and salient-poles of said stator, around which said drive coil is wound, is 4:3.

4. The motor speed controller as set forth in claim 2 wherein a ratio between the numbers of said drive magnets and salient-poles of said stator, around which said drive coil is wound, is 4:3.

5. The motor speed controller as set forth in claim 1 wherein said drive magnets are formed in an annular ring joining both edges of a belt-like magnetic material.

* * * * *